US010728164B2

(12) United States Patent
Srinivasan et al.

(10) Patent No.: US 10,728,164 B2
(45) Date of Patent: Jul. 28, 2020

(54) POWER-AWARE NETWORK COMMUNICATION

(71) Applicant: Microsoft Technology Licensing, LLC, Redmond, WA (US)

(72) Inventors: Harish Srinivasan, Sammamish, WA (US); Chris C. Gray, Redmond, WA (US); Javier N. Flores Assad, Bothell, WA (US); Benjamin M. Schultz, Bellevue, WA (US); David Powell, Sammamish, WA (US); Alvin K. Tan, Bothell, WA (US); Jean Khawand, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 737 days.

(21) Appl. No.: 15/042,571

(22) Filed: Feb. 12, 2016

(65) Prior Publication Data

US 2017/0237675 A1 Aug. 17, 2017

(51) Int. Cl.
*H04L 12/875* (2013.01)
*H04W 52/02* (2009.01)
(Continued)

(52) U.S. Cl.
CPC .............. *H04L 47/56* (2013.01); *H04L 43/50* (2013.01); *H04L 47/24* (2013.01); *H04W 52/0261* (2013.01); *H04W 52/0251* (2013.01); *Y02D 70/1262* (2018.01); *Y02D 70/142* (2018.01); *Y02D 70/144* (2018.01); *Y02D 70/23* (2018.01); *Y02D 70/26* (2018.01)

(58) Field of Classification Search
None
See application file for complete search history.

(56) References Cited

U.S. PATENT DOCUMENTS 6,122,514 A 9/2000 Spaur et al.
6,643,293 B1 11/2003 Carr et al.
(Continued)

FOREIGN PATENT DOCUMENTS

WO 2012099617 A1 7/2012

OTHER PUBLICATIONS

"International Search Report and Written Opinion Issued in PCT Application No. PCT/US2017/016319", dated Apr. 28, 2017, 10 Pages.
(Continued)

*Primary Examiner* — Jeffrey M Rutkowski
*Assistant Examiner* — Mehedi S Aley
(74) *Attorney, Agent, or Firm* — Newport IP, LLC; Jacob P. Rohwer

(57) ABSTRACT

This application describes client devices that control network transmission based on a power state. The client device determines a power state of the computing device and a priority of an application executing on the computing device. The client device determines whether to permit the application to communicate with a remote network accessible device via the network communication hardware based at least on the priority of the application and the power state of the computing device. Also described is a power state service that selects a client device to be provided with a notification based on power states of the client devices.

14 Claims, 8 Drawing Sheets

(51) Int. Cl.
*H04L 12/851* (2013.01)
*H04L 12/26* (2006.01)

(56) References Cited

U.S. PATENT DOCUMENTS

| | | | |
|---|---|---|---|
| 7,065,367 B2 | 6/2006 | Michaelis et al. | |
| 7,325,037 B2 | 1/2008 | Lawson | |
| 7,555,663 B2 | 6/2009 | Krantz et al. | |
| 7,581,224 B2 | 8/2009 | Romero | |
| 7,961,661 B2 | 6/2011 | Hargrave et al. | |
| 8,255,716 B2 * | 8/2012 | Mandyam | H04W 52/0258 713/320 |
| 8,943,335 B2 | 1/2015 | Holsen et al. | |
| 8,990,295 B2 | 3/2015 | Lau et al. | |
| 9,015,601 B2 | 4/2015 | Trombley-Shapiro et al. | |
| 9,065,765 B2 | 6/2015 | Alisawi | |
| 2002/0091826 A1 | 7/2002 | Comeau et al. | |
| 2002/0110084 A1 | 8/2002 | Butt et al. | |
| 2006/0015636 A1 | 1/2006 | Skraba et al. | |
| 2006/0221998 A1 | 10/2006 | Live et al. | |
| 2007/0217409 A1 | 9/2007 | Mann | |
| 2007/0245352 A1 | 10/2007 | Ma | |
| 2007/0286222 A1 * | 12/2007 | Balasubramanian | H04L 12/12 370/412 |
| 2008/0057894 A1 * | 3/2008 | Aleksic | H02J 9/002 455/187.1 |
| 2008/0301670 A1 | 12/2008 | Gouge et al. | |
| 2009/0010189 A1 * | 1/2009 | Nagra | H04W 40/10 370/311 |
| 2009/0124234 A1 * | 5/2009 | Fisher | G06Q 20/401 455/406 |
| 2010/0106816 A1 * | 4/2010 | Gulati | H04L 67/1097 709/223 |
| 2010/0322265 A1 | 12/2010 | Gopinath et al. | |
| 2011/0093725 A1 | 4/2011 | Theocharous et al. | |
| 2011/0151944 A1 * | 6/2011 | Morgan | H04W 52/0258 455/574 |
| 2012/0131321 A1 | 5/2012 | Jitkoff et al. | |
| 2012/0173610 A1 | 7/2012 | Bleau et al. | |
| 2012/0233287 A1 * | 9/2012 | Queru | H04L 67/06 709/217 |
| 2012/0236834 A1 * | 9/2012 | Ho | H04W 52/0216 370/337 |
| 2013/0201825 A1 * | 8/2013 | Masputra | H04L 47/60 370/230 |
| 2014/0087738 A1 * | 3/2014 | Iwabuchi | H04W 36/0011 455/437 |
| 2014/0126441 A1 | 5/2014 | Rai et al. | |
| 2014/0169302 A1 | 6/2014 | Song et al. | |
| 2015/0193241 A1 * | 7/2015 | Hamzata | G06F 3/04842 719/320 |
| 2015/0304949 A1 * | 10/2015 | Coster | H04W 52/0235 370/311 |
| 2016/0021693 A1 * | 1/2016 | Doetsch | H04W 72/042 370/329 |
| 2016/0323818 A1 * | 11/2016 | Senarath | H04W 52/0209 |
| 2017/0373522 A1 * | 12/2017 | Pelosi | H02J 7/0021 |

OTHER PUBLICATIONS

Kaiser, et al., "Software Considerations to Manage and Optimize System Power", Published on: Jan. 2012 Available at: http://rtcmagazine.com/articles/view/102414.

Nirjon, et al., "MultiNets: A System for Real-Time Switching between Multiple Network Interfaces on Mobile Devices", In Journal of ACM Transactions on Embedded Computing Systems, vol. 9, Issue 4, Mar. 2012, pp. 1-25.

Tsao, et al., "On Effectively Exploiting Multiple Wireless Interfaces in Mobile Hosts", In Proceedings of the 5th International Conference on Emerging Networking Experiments and Technologies, Dec. 1, 2009, pp. 337-348.

"Office Action Issued in European Patent Application No. 17705266.9", dated Sep. 27, 2019, 6 Pages.

* cited by examiner

POWER-AWARE NETWORK COMMUNICATION

BACKGROUND

When a device is in a low-power state, device hardware components such as radio chipsets may be powered off or put in a reduced power state. In a low-power state, it can be difficult to properly manage network connectivity to avoid unnecessary power usage. A network policy that is too stringent may result in high priority applications, such as background updating or Voice over IP (VoIP) calling, being unable to reliably operate. A network policy that is too liberal may mean that applications continue to transmit non-critical data, thereby using power unnecessarily. Some solutions exist to handle these issues. Microsoft® InstantGo (formerly known as Connected Standby) capable hardware and software have been integrated into common interfaces and integrated with operating system networking stacks and Application Programming Interfaces (APIs). Central notification services (such as the Windows® Notification Service) have been implemented and deployed to synchronize network connectivity for multiple applications during low power scenarios. Also, connection managers consider the costs of network connectivity when activating network connections or selecting between available networks.

In Connected Standby, the network communications hardware, such as a mobile broadband or Wi-Fi chipset, maintains its connection to a network in a lower power state, and if it becomes disconnected, searches for and connects to known networks. While in Connected Standby, the device—including the processor, e.g., the system on a chip (SoC)—is also in a lower power state (e.g., a connected-sleep state). Pattern-match wake is a feature used in conjunction with Connected Standby that allows the operating system to configure the network communications hardware to wake the device when the network communications hardware (e.g., WiFi) detects a pattern that matches the stored pattern. All other packets are ignored. When a packet with a matching pattern is detected, the network communications hardware sends an interrupt to the SoC to wake it up. This packet is then passed to the application that was listening and that application is able to quickly act on the data (e.g. receive a VoIP phone call).

BRIEF SUMMARY

This Summary is provided in order to introduce simplified concepts of the present disclosure, which are further described below in the Detailed Description. This summary is not intended to identify essential features of the claimed subject matter, nor is it intended for use in determining the scope of the claimed subject matter.

Examples of the present disclosure provide a network power module that controls use of networking hardware during various power states of a device. The network power module accesses a policy store to determine a priority of the application that attempts to communicate, or that registers to receive push notifications. The network power module also determines a power state of the device. Based on the power state of the device and the application priority, the network power module enables the network communication hardware to be powered up to receive and transmit data.

BRIEF DESCRIPTION OF THE DRAWINGS

The Detailed Description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Figure 1:
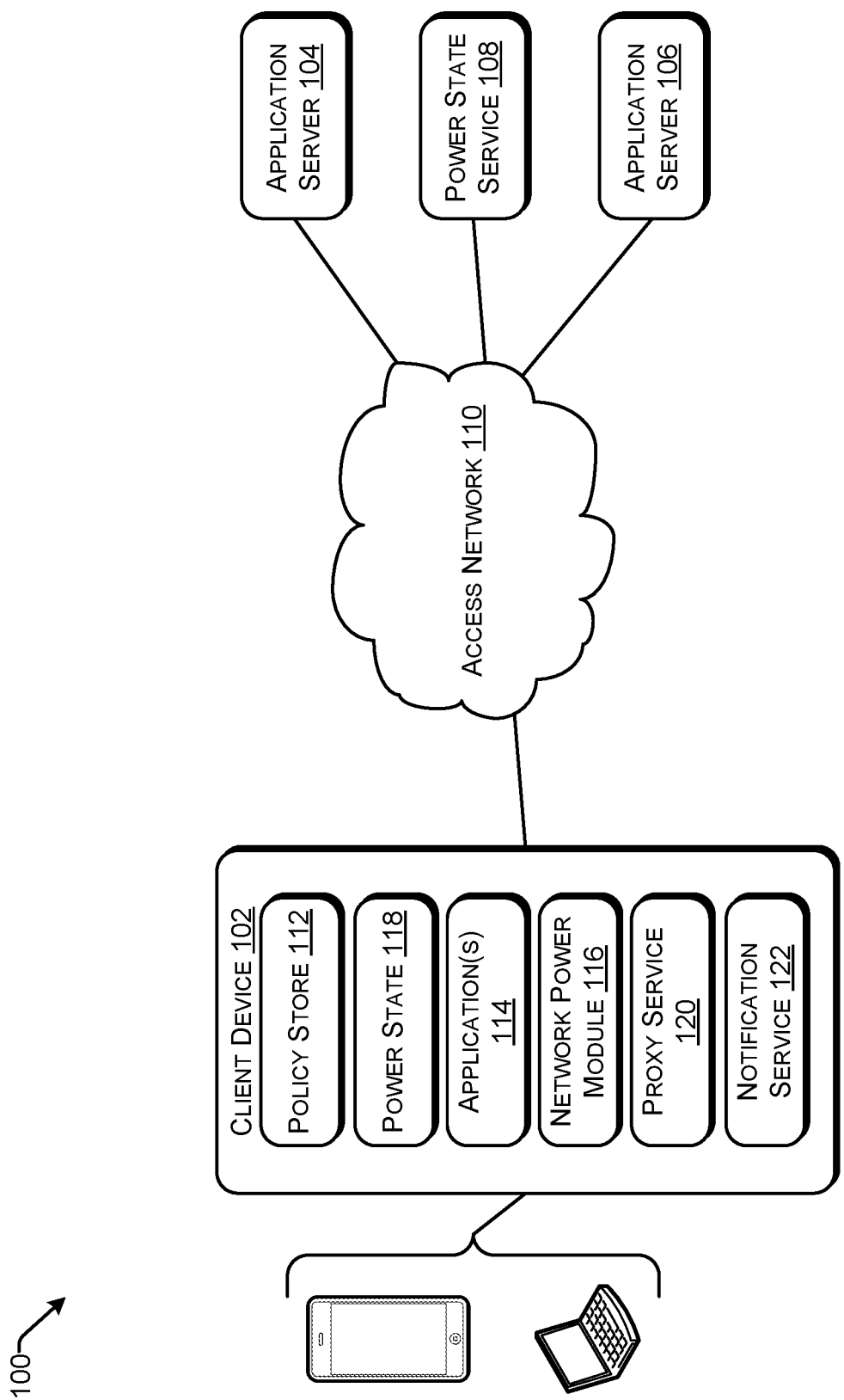
FIG. 1 is a block diagram that illustrates an example environment for power-aware networking.

Embodiments of the present application include a network power module, integrated within an Operating System, which controls the use of networking hardware during various power states of a device. Applications register with the network power module. The network power module accesses a policy store to determine a priority of the application. The application's priority may be static or configurable. The network power module also determines a power state of the device, which may be defined in various ways without departing from the scope of embodiments. The network power module—based on power state, application priority, or other factors such as remaining battery power, application state, device user interface (UI) state—enables the network communication hardware to be powered up to receive and transmit data.

In some embodiments, the network power module sets a timer in certain power states—such as in low power states. The timer establishes a timeout period, which may be adaptable, during which the device and/or the network communication hardware remains powered up and traffic may be sent. After the timer expires, the device and/or the network communication hardware revert into a low-power state. The arrival of additional high-priority traffic may cause a currently running timer to increase remaining time or to be reset, in order to give more time for the traffic to be transmitted. Low-priority traffic may be transmitted or received during the timer period. Low-priority traffic may be queued for transmission until the communication hardware is activated. In some embodiments, lower-priority traffic may cause the network power module to activate the network communications hardware if a threshold amount of lower-priority traffic queues for transmission.

In the case of push notifications (e.g., requests to receive incoming packets), applications may register with the network power module to receive push notifications. The network power module determines, based on the priority of the application, whether to establish transmit and receive queues, and register a wake pattern in the network communications hardware. The wake pattern is used by the network communications hardware to identify packets that cause the network communications hardware to wake up the device from a low-power state and provide the packets on a receive queue for the application. Once the traffic flow associated with the packet that woke the device completes, the power module causes the device and/or the network communications hardware to go back into a low-power state. The network power module may utilize a timer as discussed above, the expiration of which causes the device and/or the network communications hardware to revert into a low-power state. Low-priority traffic may also be transmitted (although it may not be) while the timer is running. The receive and transmit queues may remain active for as long as the traffic flow associated with the high priority application remains active. The network power module may determine not to set a wake pattern for low-priority applications that register to receive push notifications, depending on the power state of the device.

In the case of data to be transmitted, applications may register with the network power module. When the application has data to be transmitted, the network power module, depending on the power state of the client device and the priority of the application, may establish a receive queue and a transmit queue for the application and cause the device, including the network communication hardware, to go into a more active power state. Timers may be used to determine how long the receive and transmit queues, and the network communications hardware, remain active. Low-priority traffic may also be transmitted (although it may not be) while the timer is running. The receive and transmit queues may remain active for as long as the traffic flow associated with the high priority application remains active. Once the connection between the application and the remote device is torn down, the network power module may put the device into the low-power state and queue any low-power application traffic until the network communication hardware is re-activated.

In some embodiments, the network power module includes or is associated with a proxy service. The proxy service manages application flows and connectivity when the device is in the low-power state. For example, if a user changes networks from WiFi to Ethernet, the proxy service will re-establish connectivity for certain applications. Use of a proxy service decouples the application management from the power state management. This may simplify the programming of applications and ensure compatibility with existing applications.

In some embodiments, client devices provide power state information to a remote, network-accessible device power state service. The device power state service enables application servers that have data to transmit to a user associated with the client devices to use power state information to select from amongst the client devices to send the data. In one example, a user may have three devices associated with him or her, including a laptop, a mobile phone, and a tablet computer. The device power state service may receive power state updates from all three of these devices, and provide that information to the application servers. The application servers, having push notifications to send to the user, may select one of the three devices to transmit the push notification to based on device power state, such as a device being in an active mode or an idle connected mode, as opposed to one in a connected-sleep mode or a disconnected-sleep mode. Multi-device selection may include other inputs such as how much power is remaining on the battery powered devices and how recently the device was used.

As used herein, "flow" refers to data communication traffic, including bidirectional traffic, which is defined by an application communication session (or just "application session") between two network-connected endpoints, such as an application executing on a user device and an application server. Some example applications include web browsers, email clients, file transfer protocol clients, file servers, media player applications, mobile phone apps, and so forth. An application server may include a web server, an email server, an FTP server, a media server, a file server, and so forth. An application communication session includes a communication session between an application and an application server, although a communication session may be between two client devices, or between two server devices. A communication session may also be multi-point. A single application communication session may be defined or determined by some or all of a 5-tuple of source address, destination address, protocol, source port, and destination port. The source and destination address may include an Internet Protocol (IP) address, such as an IP version 4 (IPv4) or IP version 6 (IPv6) address. Other source and destination address types may be utilized such as Media Access Control (MAC) addresses, or others.

The protocol in the 5-tuple may include Transport Control Protocol (TCP), User Datagram Protocol (UDP), Stream Transmission Control Protocol (SCTP), Datagram Congestion Control Protocol (DCCP), or other protocol. These protocols may generally fall under or may be referred to as belonging in the "transport layer" of the Open Systems Interconnection model (OSI model), although such protocols may not strictly conform the definitions provided by the OSI model for a transport layer protocol. To the extent that "transport layer" or other OSI model term (such as application layer, network layer, "layer 2," etc.) are used herein to describe a protocol or other concept, usage of these OSI terms are not meant to imply that any such protocol or concept strictly conforms to the definitions within the OSI model, although it is possible that such protocols or concepts do meet those definitions.

The destination port information in the 5-tuple may indicate various higher-layer protocols (e.g., application layer protocols under the Open Systems Interconnection model (OSI model). Such higher-layer protocols include, in some embodiments, hyper text transfer protocol (HTTP) (often but not necessarily indicated by TCP or UDP port 80), HTTP Secure (HTTPS) (often but not necessarily indicated by TCP or UDP port 443), FTP (often but not necessarily indicated by TCP or UDP port 20 (for data transfer) and port 21 (for FTP control)), Secure Shell (SSH) (often but not necessarily indicated by TCP or UDP port 22), Real Time Transfer Protocol (RTP) (often but not necessarily indicated by TCP or UDP port 5004). The higher-layer protocols may include various email-based protocols such as various versions of Post Office Protocol (POP, such as POP2, POP3) (often but not necessarily indicated by TCP or UDP port 109 (POP2) or port 110 (POP3), various versions of Internet Message Access Protocol (IMAP, such as IMAP4) (often but not necessarily indicated by TCP port 143), Microsoft® Messaging Application Programming Interface (MAPI) (often but not necessarily indicated by TCP or UDP port 135), Simple Mail Transfer Protocol (SMTP) (often but not necessarily indicated by TCP or UDP port 25), and so forth. Other example destination ports and associated higher-layer protocols may be used without departing from the scope of embodiments. There are tens of thousands of official, registered, and unofficial TCP and UDP ports defined and in use, and embodiments are not limited to one or more of them. Also, although a port number may be an official port for a particular protocol (as defined for example by the Internet Assigned Numbers Authority (IANA)), other ports may be associated with a particular protocol. For example, although port 443 may be the official port for HTTPS, a client and an application server may be configured to utilize some other port number to indicate an HTTPS connection.

The source port information in the 5-tuple may be any port number associated with the packet. Source ports are often utilized by clients and application servers to distinguish traffic from amongst multiple application requests. Thus, where the same client device sends multiple packets having same source address, destination address, protocol, and destination port, but the packets have different source ports, the different source ports may indicate that the packets are associated with different communication sessions between the same client or client application and the application server. For example, a web browser client software on a client device may establish two HTTP connections to the same application server, such as in two different browser windows, to obtain different web pages, and this may (although it might not) result in multiple source ports being utilized, and thus result in two application communication sessions. In embodiments, one or more of the 5-tuple data may be used to define or determine an application communication session, such that all packets having the same 5-tuple elements (same source and destination address, protocols, and same source and destination ports) are treated as belonging to the same communication session, and thus to the same "flow."

The communication sessions may be determined or defined based on other data besides the above-described 5-tuple, such as higher-layer protocol data flow data. In some embodiments, a connection may be determined from state information found in the higher-layer traffic flows. To use HTTP as just one example, an HTTP session may be defined based on a client and an HTTP server exchanging a SYN, SYN_ACK, and ACK commands to request and accept a TCP session to be established between the client and server. These exchanges may be followed by exchanges of requests by the client for data from the server such as by issuing HTTP_GET commands and HTTP_200_OK replies, and other types of HTTP exchange communications. The HTTP session may end with an issuance of a FIN command and an ACK reply. Thus, embodiments may determine an application communication—or "flow"—based on such higher layer protocol flows.

These example group of communications—whether defined or determined based on some or all of the addresses/protocol/ports quintuple, higher-layer state information (such as HTTP or other state data as described above), some combination of the 5-tuple and higher-layer protocol data, other data as may be appropriate—represent a communication session, also referred to as a "flow."

Various examples are described below with respect to the figures. These examples are merely exemplary, and embodiments of the present disclosure are not limited to the examples described below and illustrated in the figures.

FIG. 1 is a block diagram that illustrates an example environment 100 for power-aware networking. A client device 102 is configured to communicate with remote network-connected devices, such as application server 104, application server 106, and a power state service 108. The client device 102 communicates with the remote network-connected devices through an access network 110. The client device 102 may access these networks utilizing any of various wired or wireless communications technologies. The access network 110 may be any of various wireless networks, such as but not limed to any of various IEEE 802.11 Wireless LAN compliant networks, mobile communications networks such as Global System for Mobile Communications (GSM), Long-Term Evolution (LTE) networks, and so forth. The access network 110 may include any of various personal area networks including but not limited to IEEE 802.15, Bluetooth®, and so forth. The access network 110 may include wired connections, including but not limited to wired Ethernet networks, such as those defined by IEEE 802.3, fiber-optic networks, and so forth. The access network 110 may provide access to the public Internet, or to other wide area networks, to campus-area networks, metropolitan area networks, and local area networks, and so forth. Servers and services connected to access network 110 may directly connect, or do so via other networks such as the public Internet. Other types of networks and network topologies (e.g. multiple access networks) may be utilized without departing from the scope of embodiments.

The client device 102 includes a policy store 112 that stores priority information for one or more applications 114 on the client device. The priority information may be static or configurable. Where configurable, the priority may be configured by a user (such as during or after install), by a group policy, or by some other mechanism. Some applications may have a statically assigned priority, such as critical applications including Enhanced 911 (E911) calling. One or more of the applications 114 may use a notification service 122.

The client device 102 includes a network power module 116. The network power module 116 permits the applications 114 to communicate with the remote network-connected devices based at least on the power state 118 of the client device 102 and based on the priority of the applications stored in the policy store 112. In some embodiments, the power state 118 of the client device 102 may include a device power management mode, such as an active mode, a connected-idle mode, a connected-sleep mode, a disconnected-sleep mode, a radio-off mode, and so forth. To a user, one or more of the power modes may look like the device is "on," "wake," "asleep," "powered down," and so forth. A power state 118 may also include a battery level, a state of being plugged into mains electricity or grid power (e.g., plugged into a household or building power), a state of operating under battery power, and so forth. A power state 118 may include a hardware state of the device, such as the network communication hardware of the client device 102 being powered up, powered down or low, a processor being powered up, powered down or low, a memory operating under a low-power mode, and so on. A power state 118 of the device may include a software state of the device, such as certain software modules or components (including operating system components or modules) being stopped, suspended, operational, and so forth. Embodiments are not limited to any particular type or types of power states 118.

A proxy service 120 may also be included in the client device 102. The proxy service 120 may proxy communications between the applications 114 and the remote network-connected devices. The proxy service 120 may manage communication flows between the applications 114 and the remote servers (e.g., the application servers 104 and 106) during some but not all power states, such as during one or more "low" power states 118. The proxy service 120 may also manage power management functions within the client device 102 on behalf of the applications 114, such as during one or more power states 118. Example power management functions include powering on network communication hardware using power management Application Programming Interfaces (APIs) or other operating system or network driver features.

As used herein, a "proxy" is a software or hardware element that acts as an intermediary between a client (e.g., one of applications 114) and a server (e.g., the application servers 104 and 106). The proxy service 120 may communicate with the application 114, as if it were the resource that the application 114 is attempting to access. Upon receiving a connection attempt (e.g., an HTTP SYN) from the application 114 to access a resource, the proxy service 120 may reply as if it were the resource (e.g., send an HTTP SYN ACK back to the application 114). Then the proxy service 120 may, depending at least on the power state and the priority of the application 114, enable the network communication hardware of the device 102 and send a HTTP SYN to the service 118. Other examples of proxy service 120 operation are possible without departing from the scope of embodiments.

As discussed in more detail below, the network power module 116 receives attempts or requests from the applications 114 to transmit data or to receive push notifications and/or background transfers from the remote network-connected devices. Such requests are captured via an API or similar software construct. In these examples, the applications 114 are configured to make API calls to the network power module 116. In some embodiments, such requests may be intercepted by the network power module 116, such as by the proxy service 120 of the network power module 116. For example, the proxy service 120 may intercept an HTTP SYN or other communication from the applications 114.

Based on the application priority in the policy store 112 and the power state 118 of the device, the network power module 116 may, responsive to the requests or attempts from the applications 114 to communicate, create a transmit queue and a receive queue, and set a control channel for the application 114 communication. The network power module 116 may provide the control channel with an access control list (ACL) or other filter data that permits the control channel to allow traffic received on the receive queue to be provided to the application 114.

The network power module 116 sets a timer upon determining to permit an application 114 to transmit or receive. The network power module 116, and/or the proxy service 120, may maintain state information regarding the application flow between the applications 114 and the remote network-connected devices. The client device 102 may transmit packets associated with a particular communication flow of a high priority application. The client device 102 may transmit packets, from high priority applications and/or from low priority applications, during a time prior to expiration of the timer. Further requests from the same or different high-priority application to communicate may cause the timer value to be increased. Other examples are possible without departing from the scope of embodiments. A more specific set of examples of the client device 102 are illustrated below in FIG. 2.

Figure 2:
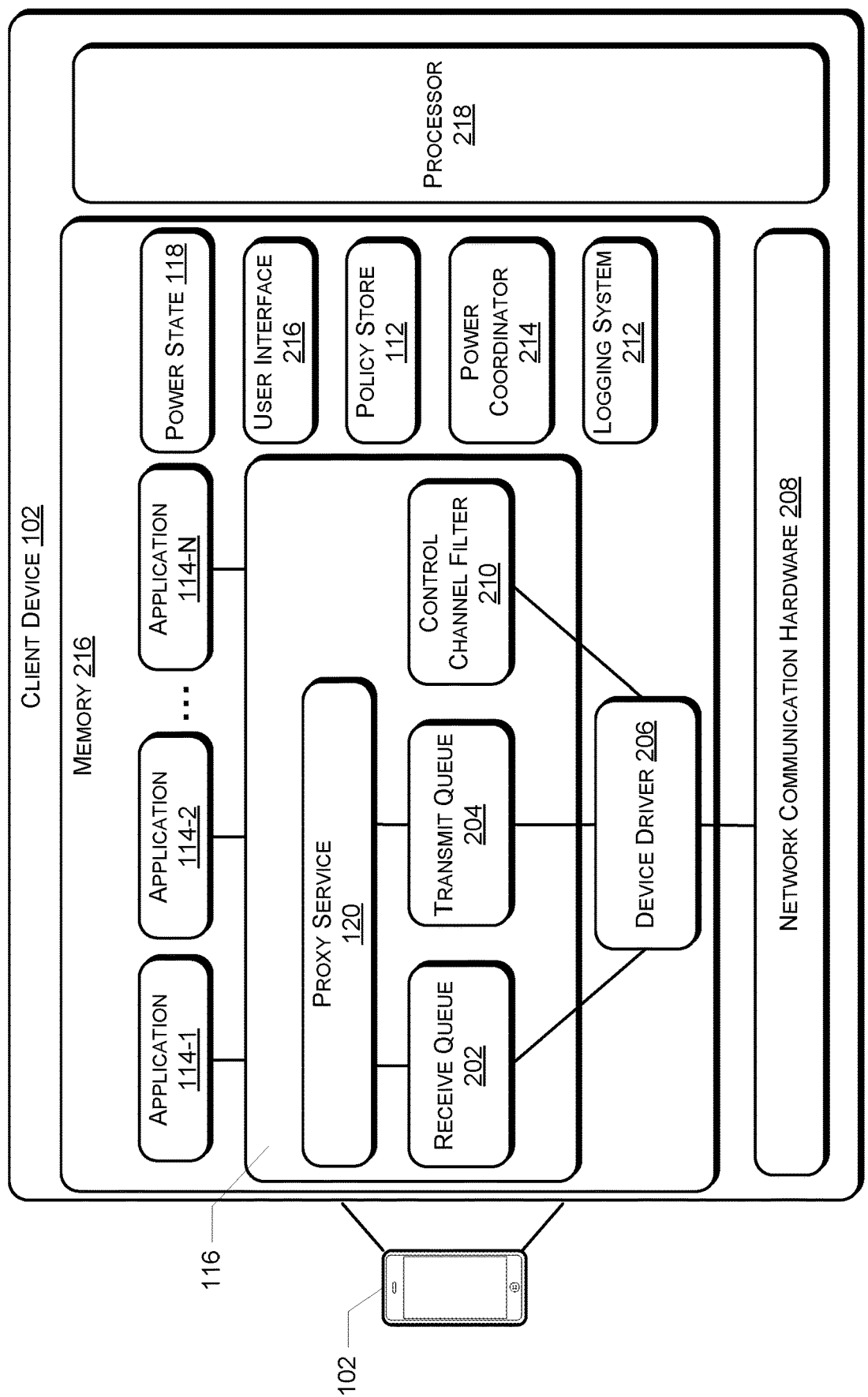
FIG. 2 is a block diagram that illustrates an example client device for power-aware networking.

FIG. 2 is a block diagram that illustrates an example client device 102 for power-aware networking. The network power module 116 establishes a receive queue 202 and a transmit queue 204 to handle per-application traffic from the applications 114-1 through 114-N. The network power module 116 configures the transmit queue 204 to manage per-application traffic based on a given power state 118 of the client device 102. The transmit queue 204 is configured to determine which device driver 206 and during what time interval to transmit packets associated with application traffic, given the power state 118. The transmit queue 204 receives packets associated with the application traffic, and takes one of several actions depending on the power state 118 and based on the priority information in the policy store 112. The network communication hardware 208 may have more than one associated device driver 206. Note that in some embodiments, one device driver may manage multiple instances of network adapters, which may include multiple physical and/or virtual network adapters including for example the network communication hardware 208. The network communication hardware is an example of a physical network adapter. For simplicity, we will refer to each of those instances as device driver 206.

The network power module 116 configures the receive queue 202 to receive, from the device driver 206 and the network communication hardware 208, traffic from one of applications 114-1 through 114-N and to determine a time window during which to provide the application traffic up the network stack to the proxy service 118 and/or to the applications 114-1 through 114-N. The receive queue 202 receives packets associated with the application traffic, and takes one of several actions depending on the power state 118 and based on the priority information in the policy store 112. The receive queue 202 may configure the device driver 206 to offload listening for matching network traffic to the hardware (e.g., the network communication hardware 208). For example, the network power module 116 may cause the network communication hardware 208 to be configured to listen for network traffic that matches the high-priority traffic associated with the applications 114-1 through 114-N, and to provide matching traffic to the receive queue 202. The receive queue 202 passes matching traffic to the applications 114-1 through 114-N and/or the proxy service 120 (such as where the proxy service 120 manages the application flows on behalf of the applications 114). The network communication hardware 208 may match traffic based on an access control list, e.g., a 5-tuple that identifies traffic that is associated with the applications 114-1 through 114-N that are allowed to be received based on priority and power state.

The network power module 116 configures the transmit queue 204 to provide to the device driver 206 traffic based on a priority of the applications 114-1 through 114-N that attempt to transmit or receive and based on the power state 118 of the client device 102. More generally, the transmit queue 204 determines a time window during which to transfer the application traffic, based on the power state 118 of the device and the priority of the applications 114-1 through 114-N. Based the power state 118 and the priority of different ones of the applications 114-1 through 114-N, the transmit queue 204 may cause transmission of the data at a current time by providing the data to the device driver 206, or queue it up for later transmission.

An example application priority table stored in the policy store 112 is shown in Table 1 as follows:

TABLE 1

| Application | Priority |
|---|---|
| A | High |
| B | Medium |
| C | Low |

Associated with the application priority table may be a power state table, an example of which is shown in Table 2 as follows:

TABLE 2

| Power State | High | Medium | Low |
| --- | --- | --- | --- |
| active | allow | allow | allow |
| connected-idle | allow | allow | allow |
| connected-sleep | allow | allow | deny |
| disconnected-sleep | allow | deny | deny |
| radio-off/physical layer off | allow | deny | deny |

In the examples shown above, application A has high priority, application B has medium priority, and application C has low priority. These priority designations are examples only, and other designations may be made without departing from the scope of embodiments. For example, priority may be designated as a numeral or number, a letter, and generally any machine-readable code. Table 2 shows five different example power states, although other power states may be included in example policy stores 112. These policies may include battery power levels (percent of battery power, range of battery powers, etc.), whether the device is attached to grid or mains power, hardware power states (CPU powered down, memory on low-power mode, network hardware in low power mode), and so forth. These power levels may be defined by a specification such as the Advanced Configuration and Power Interface (ACPI) or be proprietary. Designation of particular power states are shown in Table 2 for the sake of illustration only.

Other policies may be stored in the policy store 112. For example, the policy tables may indicate that some applications have a first priority (e.g., a high priority) for push notifications and background transfers, and a second priority (e.g., a low priority) for transmissions. In some embodiments, applications may be treated as having higher priority based on their execution states. For example, an application that is in the foreground state may be treated as having higher priority than applications executing in the background state. One example is a browser. Where the user is viewing the browser in the foreground of the user interface 216, requests from the browser result in the network power module 116 allowing the traffic, while requests from the browser while the browser is not executing in the foreground (such as a periodic refresh) may be denied and queued up for later transmissions. Other examples are possible without departing from the scope of embodiments.

The receive queue 202 may receive an indication from the device driver 206 that the network communication hardware 208 has received one or more packets for a particular one of the applications 114-1 through 114-N (e.g., one of applications A, B, or C). Based on the power state of the client device 102 and the priority of the one of the applications 114-1 through 114-N, the receive queue may provide the packets to the applications 114-1 through 114-N and/or the proxy service 120. Similarly, the transmit queue 204 may receive one or more packets from a particular one of the applications 114-1 through 114-N and/or the proxy service 120. Based on the power state of the client device 102 and the priority of the particular one of the applications 114-1 through 114-N, the transmit queue 204 may provide the packets to the device driver 206 for transmission via the network communication hardware 208.

In addition to providing an access list for allowing or denying transmit and receive packets based on power state 118 and application priority, the priority table in the policy store 112 may also be used by the network power module 116 to cause the network communication hardware 208 to be enabled. For example, for application traffic that Table 2 indicates to "allow" traffic, the network power module 116 may cause—upon receiving a request from an application 114 to transmit or receive—the network communication hardware 208 to transition from a radio-off state to an active state and be enabled. Where the Table 2 indicates to "deny" traffic, the network power module 116 may decline to enable the network communication hardware 208.

In some embodiments, the network power module 116 may receive requests from applications 114-1 through 114-N to transmit or receive, and deny those requests based on the policy store 112. In such cases, the network power module 116 may still establish a receive queue 202 and transmit queue 204 for the network traffic from the denied ones of applications 114-1 through 114-N. The traffic from the low-priority ones of applications 114-1 through 114-N queues up. At some later time, the queued traffic may be transmitted. There are several situations in which this may occur.

For example, a sufficiently large amount of low-priority traffic may accumulate for transmission. The network power module 116 may determine that a threshold amount of traffic—a threshold amount of data, a threshold number of packets, etc.—is queued up for low-priority applications (either transmit traffic or received traffic in various embodiments). The network power module 116 may cause transmission of the queued-up traffic via the network communication hardware 208 and the device driver 206. The network power module may provide received low-priority traffic that is queued up to the applications 114-1 through 114-N. The network power module 116 may cause the network communication hardware 208 to power up, or otherwise transition to a different power state so that data can be received and/or transmitted. The network power module 116 may provide the transmit traffic to the device driver 206. The low-priority traffic may be transmitted and received (e.g., provided to the applications 114-1 through 114-N, until a timer set by the network power module 116 expires.

In a second example, high-priority traffic may activate transmission via the device driver 206 and the network communication hardware 208. If this happens, the network power module 116 may also allow the queued-up low priority traffic—and any additional low-priority traffic that is received from the applications 114-1 through 114-N and received via the network communication hardware 208. The high-priority traffic may be transmitted via the device driver 206 and the network communication hardware 208 at a higher priority than the lower priority traffic. The high-priority traffic that is received via the network communication hardware 208 may be provided to the applications 114-1 through 114-N at a higher priority than lower priority traffic is provided to the applications 114-1 through 114-N. The low-priority traffic may be transmitted and received (e.g., provided to the applications 114-1 through 114-N, until a timer set by the network power module 116 expires.

In a third example, queued-up low priority traffic may be transmitted via the network communication hardware 208 and/or provided to the applications 114-1 through 114-N based at least on the network power module 116 detecting a change in the power state 118 of the device 102. A power state 118 change may occur based on a user waking the device, plugging the device 102 into a power supply, a manual (user-initiated) change in the power state 118, a pre-programmed change (such as a power state 118 change that occurs at pre-programmed times of the day), and so forth.

The network power module 116 may configure a control channel filter 210 to enable selective communication between the applications 114-1 through 114-N and/or the proxy service 120 and the device driver 206. In conventional operation, a control channel enables applications to communicate with the device driver 206 to be notified of data that is received for (such as while the application is not running as a foreground application). In embodiments of the present disclosure, the control channel filter 210 selectively provides these notifications to the applications 114 based on the power state. Thus, the network power module 116 may configure the control channel filter 210 as the power state 118 changes and/or as applications 114-1 through 114-N request to transmit or receive communications. The control channel filter 210 may include an access control list that identifies packets to be provided to the applications 114-1 through 114-N, such as by using a 5-tuple. Data packets received by the network power module 116 from the device driver 206 that match the access control list are provided by the control channel filter 210 result in the network power module 116 notifying the applications 114-1 through 114-N of the network traffic. As the power state changes, and/or as applications request to transfer and receive data, the network power module 116 reconfigures the control channel filter 210.

The control channel filter 210 may set a timer during which the client device 102 transmits or receives traffic. The control channel filter 210, in some embodiments, calculates the expiry value of the timer using an adaptive method in which one or more parameters feed into the control channel filter 210 as coefficients. The control channel filter 210 results in an expiry value. The one or more parameters may include one or more of: network performance including latency on the network (e.g., round trip time), jitter (variability in delay), throughput (e.g., packets per second, bits per second, etc.), the number of applications 114-1 through 114-N that have the sockets open (e.g., those applications indicating that they are in a communication state by opening a Winsock socket for a network adapter), the priority of the applications 114-1 through 114-N, the interface type of the network communications hardware 208 (e.g., 802.3, wireless LAN (e.g., Wi-Fi), Wireless WAN (e.g., mobile broadband, etc.), the location of the client device, the power state 118 of the client device 102, the number of applications requesting to transmit or receive data, historical data such as a typical amount of length of time that the applications 114 transmit and/or receive data, and so forth. In just one example, a longer delay time and/or smaller throughput values experienced on the network may result in a longer timeout period.

In some embodiments, the client device 102 includes a logging system 212 that tracks historical data of applications 114-1 through 114-N. The control channel filter 210 utilizes the historical data to set the expiry value of a timer, or for other purposes.

In some embodiments, the client device 102 includes a power coordinator 214, which may be a kernel component of an Operating System. The power coordinator 214 coordinates power policy across various aspects of the device including compute (CPU), graphics, storage, network communication hardware 208. and other peripherals. In particular, when the client device 102 enters a low-power state, the power coordinator 214 notifies the peripherals of the impending change and instructs them to also enter into low-power states. In some embodiments, the network power module 116 notifies the power coordinator 214 of the changes to the power state 118 of the client device 102.

In some embodiments, the network power module 116 anticipates requests by the applications 114-1 through 114-N. For example, user interaction with the user interface 216 may indicate that one or more applications 114-1 through 114-N is soon to transmit. A user typing a uniform resource locator (URL) into a browser window may indicate that a transmission attempt is forthcoming. The network power module 116 determines that transmission is anticipated, wakes the network communication hardware 208 based on priority of the application 114 (in this case, the browser) and the power state 118 of the device 102, and establishes the receive queue 202 and the transmit queue 204, along with the control channel filter 210. Other examples are possible without departing from the scope of embodiments.

The client device 200 includes memory 216 and processor 218, which are described in more detail elsewhere within this detailed description.

Figure 3:
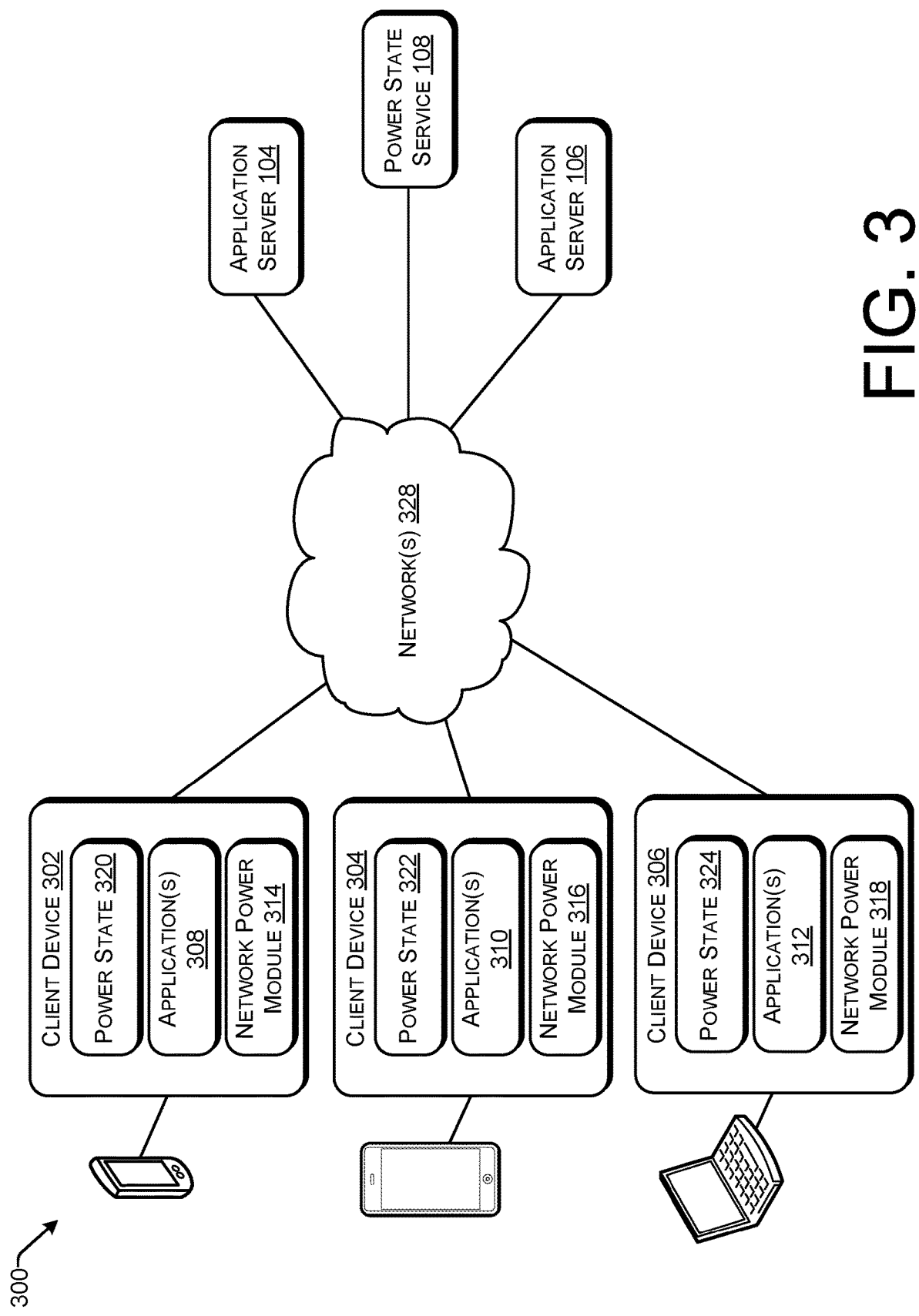
FIG. 3 is a block diagram that illustrates an environment having an example power-aware presence service.

FIG. 3 is a block diagram that illustrates an environment 300 having example power-aware presence service. Environment 300 includes client device 302, client device 304, and client device 306, all of which are associated with a single user or user account. In the examples illustrated in FIG. 3, the client device 302 is a handheld mobile device, such as a smart phone, personal media player, or handheld game device. The client device 304 is a tablet computer and the client device 306 is a laptop, netbook, or similar device. In general, the client devices according to embodiments may be servers, tablet computers, laptops, desktop computers, gaming consoles, media players, mobile phones, handheld computers, wearable devices, smart appliances, and so forth. Embodiments are not limited to any one type or types of client devices.

The client devices 302-306 include applications 308-312, respectively, as well as network power modules 314-318, respectively. The applications 308-312 may be the same as or similar to the applications 114-1 through 114-N. The network power modules 314-318 may be the same as or similar to the network power module 116. Thus, the network power modules 314-318 may be configured to enable network communication hardware to be powered up to receive and transmit data based on power state, application priority, or other factors such as application state, device user interface (UI) state as described elsewhere within this Detailed Description.

The network power modules 314-318 are configured to provide presence information, including power states 320-324 of their respective devices to the power state service 108. In some embodiments, the network power modules 314-318 provide their respective power states 320-324 to one or more application servers, such as the application servers 104 and 106. The power state service 108 may run as a service on the same server device as one or both of the application servers 104 and 106.

The power state service 108 may communicate the power states 320-324 to the application servers 104 and 106. The application servers 104-106 may communicate the power states 320-324 to each other, or to other application servers, such as in a peer-to-peer arrangement.

The application servers 104 and 106 may provide notification services, e.g., push notification services, or otherwise initiate communication with the client devices 302-306. One example may be that the application servers 104 and 106 are IP telephony servers configured to provide an indication to the client devices 302-306 that there is an incoming IP telephony call. The applications 308-312 may be, for example, IP telephony clients that receive the notifications of the incoming call. Embodiments may include other example applications besides IP telephony. Embodiments are not limited to any one type or types of applications or notification services.

Since the client devices 302-306 are associated with a common user or user account, an incoming push notification associated with the common user or user account could be received by any of the client devices 302-306. To use the IP Telephony example above, the user may receive an incoming call notification to any of the client device 302, 306, and 308. In a conventional system, if all three have registered their online presence state with the application servers 104 and/or 106, they may all receive the incoming call notification. The client devices 302-306 may all therefore "ring" to indicate the incoming call. Where some of the client devices 302-306 are in a low power state, the incoming call may unnecessarily wake up ones of the client devices 302-306 that are in a low-power state. For example, the user's laptop (client device 306) may be awake, but the mobile phone (client device 302) and the tablet computer (client device 304) may be in a low-power mode. Thus, it may be unnecessary to wake up client devices 302 and 304 by sending them a notification of the incoming call.

In some embodiments, the application servers 104 and 106 select a subset of the client devices 302-306 to which to provide notifications. In some embodiments, the application servers 104 and 106 select the subset of the client devices 302-306 based on the power state information 320-326. The application servers 104 and 106 may also select client devices to notify based on configurable information, including for example a priority list for the client devices 302-306. The priority list may be configurable, such as via the applications 308-312, through operating system configuration features, through a group policy, or in other ways. The priority list may indicate an order in which the client devices 302-306 are to be notified. Thus, if more than one client device 302-306 is in an "on" or active state (for example), then the priority list may be used to select the specific powered-on client device(s) to receive notifications. A policy may be implemented as shown in the following Tables 3 and 4.

TABLE 3

| Client Device | Priority |
| --- | --- |
| A | High |
| B | Medium |
| C | Low |

Associated with the application priority table may be a power state table, an example of which is shown in Table 4 as follows:

TABLE 4

| Power State | High | Medium | Low |
| --- | --- | --- | --- |
| active | always | allow | allow |
| connected-idle | always | allow | allow |
| connected-sleep | allow | allow | deny |
| disconnected-sleep | deny | deny | deny |
| radio-off | deny | deny | deny |

In the example policy described in Table 4, the application servers 104 and 106 notify the high priority client devices of an incoming notification in the active and connected-idle power states. Where the action is to "allow" notifications in Table 4, this may mean in some embodiments that a notification may be sent to the device in that power state. The application servers 104 and 106 may transmit notifications to the client device that has the highest priority that is in a power state having a corresponding allow or always action in the policy. In some examples, the application servers 104 and 106 may transmit the notifications to more than one client device, such as all that are in power states having an always or allow action according to the policy. Other examples are possible without departing from the scope of embodiments.

The power states used in Table 4 are just example power states. The client devices 302-306 may report other power states to the power state service 108 and applications 104 and 106. And the power state service 108 and applications 104 and 106 may use such other power states to determine one or more client devices 302-306 to provide notifications to in some embodiments. Also, other information may be reported and used to select client devices to provide notifications to, such as UI states (e.g., notification of applications in a foreground state of the UI), battery power levels (e.g., treat as high if power level is above a first level or percent, medium if between two levels or percents, and so forth), time since last user activity (e.g., treat as high if user activity within certain threshold time period, otherwise treat as medium or low, etc.). Other examples are possible without departing from the scope of embodiments.

FIG. 3 shows the client devices 302-306 communicating with the application servers 104 and 106, as well as the power state service 108, via a network 328. But more networks may be utilized in some embodiments. For example, the client device 302 may communicate via a first network (e.g., a Wi-Fi network) while the client devices 304 and 306 communicate via a second network (e.g., an LTE network). Other examples are possible without departing from the scope of embodiments.

FIGS. 4-7 depict flow diagrams that show example processes in accordance with various examples. The operations of these processes are illustrated in individual blocks and summarized with reference to those blocks. These processes are illustrated as logical flow graphs, each operation of which may represent a set of operations that can be implemented in hardware, software, or a combination thereof. In the context of software, the operations represent computer-executable instructions stored on one or more computer storage media that, when executed by one or more processors, enable the one or more processors to perform the recited operations. Generally, computer-executable instructions include routines, programs, objects, modules, components, data structures, and the like that perform particular functions or implement particular abstract data types. The order in which the operations are described is not intended to be construed as a limitation, and any number of the described operations can be combined in any order, separated into sub-operations, and/or performed in parallel to implement the processes. Processes according to various examples of the present disclosure may include only some or all of the operations depicted in the logical flow graphs.

Figure 4:
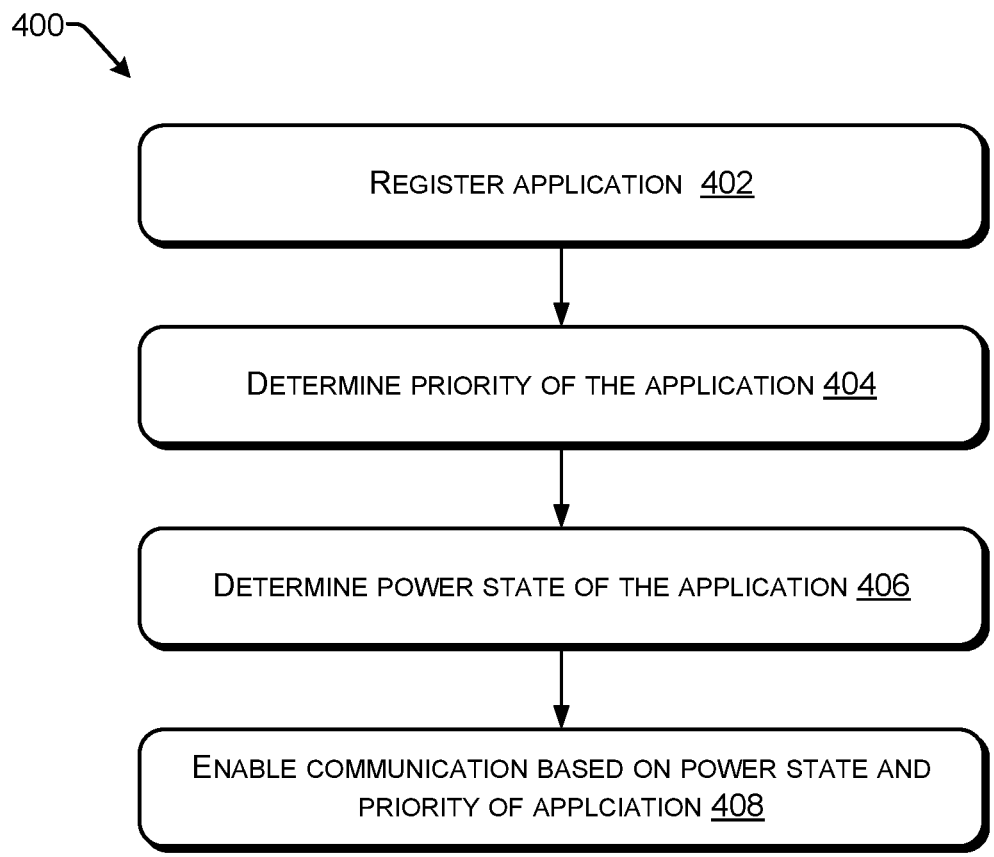
FIG. 4 illustrates a flow chart showing an example process for power-aware networking.

FIG. 4 illustrates a flow chart showing an example process 400 for power-aware networking. At 402, a network power module, such as the network power modules 116, 314, 316, and 318, register an application. The application may register with the network power module by calling an API, opening a communication socket in an attempt to communicate using a network adaptor, or in some other way. In some embodiments, the network power module is a component of an operating system of a computing device. The application may register to receive push notifications (to receive communications initiated by the remote network-accessible device) or to transmit data (e.g., initiate a communication flow).

At 404, the network power module determines a priority of the application. The network power module may determine the priority of the application be accessing a policy store, such as in the policy store 112, which stores the priority information. In some embodiments, the priority of the application may be fixed or configurable. For example, an E911 application may be given a high priority, which may not be configurable. The examples included herein describe applications as having "high," "medium," and "low" priorities. But application priority may be designated or indicated using essentially any machine-readable code, such as alphanumeric priority indicators, or others.

At 406, the network power module determines a power state of the computing device. The power state may include a device power management mode, such as an active mode, a connected-idle mode, a connected-sleep mode, a disconnected-sleep mode, a radio-off mode, and so forth. To a user, one or more of the power modes may look like the device is "on," "wake," "asleep," "powered down," and so forth. A power state may also include a battery level, a state of being plugged into mains electricity or grid power (e.g., plugged into a household or building power), a state of operating under battery power, and so forth. A power state may include a hardware state of the device, such as the network communication hardware of the client device being powered up, powered down or low, a processor being powered up, powered down or low, a memory operating under a low-power mode, and so on. A power state of the device may include a software state of the device, such as certain software modules or components (including operating system components or modules) being stopped, suspended, operational, and so forth. Embodiments are not limited to any particular type or types of power states.

At 408, the network power module permits the application to communicate with a remote network-accessible device via network communication hardware, based at least on the priority of the application and the power state of the computing device. This may include, for example, turning on or powering up communication hardware of the client device. This may include setting a timer, permitting application traffic to be transmitted until the timer expires, permitting received traffic to be provided to the application until the timer expires, and so forth. The network power module prevents the application from communicating with the remote network accessible device after expiration of the time period of the timer. The network power module may increase an amount of time of the timer based at least on receipt of additional traffic associated with the application or with another application having a sufficiently high priority.

Figure 5:
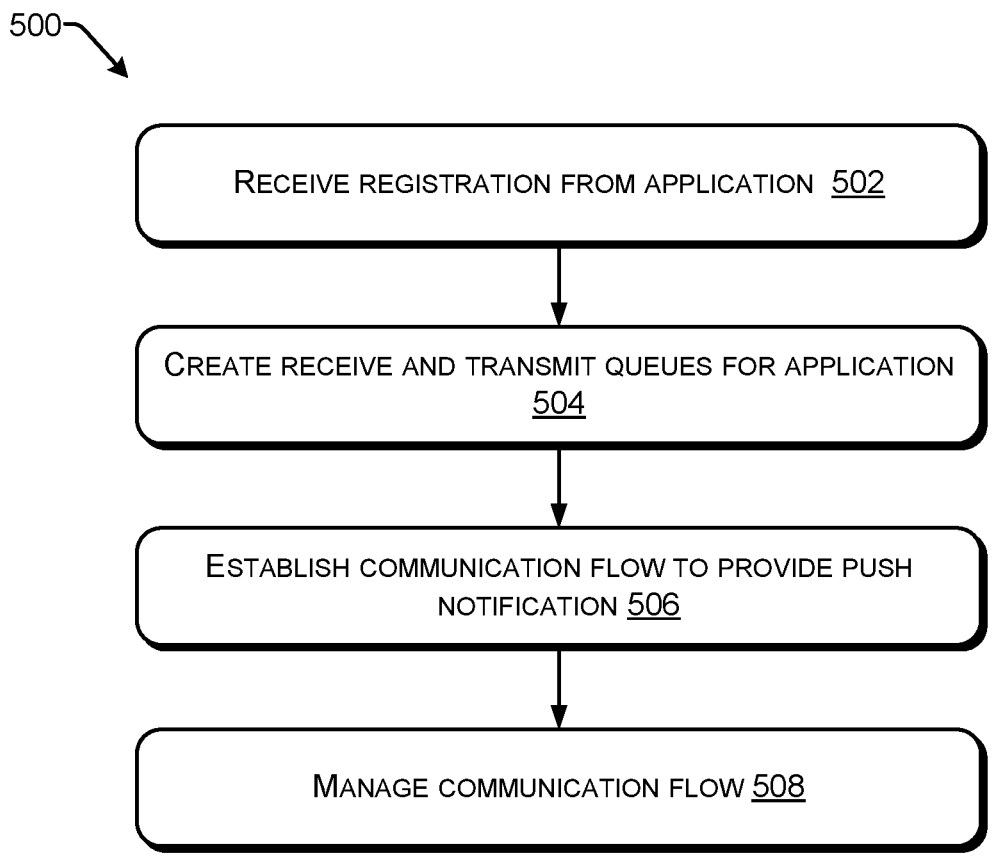
FIG. 5 illustrates a flow chart showing an example process for enabling an application to receive push notifications based on a power state of the client device.

FIG. 5 illustrates a flow chart showing an example process 500 for enabling an application to receive push notifications based on power state of the client device. At 502, the client device registers for push notifications and background transfer with a network power module, such as the network power module 116, 314, 316, and 318. The network power module stores the registration request, such as in a policy store, and notifies a device power coordinator of the client device. The Device Power Coordinator coordinates power policy across all aspects of the device including compute (CPU), graphics, storage, network and other peripherals.

At 504, the network power module creates a receive queue and a transmit queue for the application, and sets a power-sensitive control channel filter. Based on the priority of the application, the network power module updates the hardware offloads in a network adapter to "listen" for push notifications in the background when in various power states, such as a low power state. For example, the network power module may provide the network adapter with a wake mask or similar that matches the high priority traffic. The wake pattern(s) are then applied to the network communication hardware.

At 506, the remote network accessible device establishes a communication flow with the application. The communication flow is established based on the receive queue being notified of receipt of a data packet matching the registered push notification for the application and providing the data packets to the application.

At 508, a proxy service manages the communication flow. The proxy service may manage the communication flow in various power states, such as in all power or only a subset of power states, such as in a low power state. The power state of the network hardware or the client device may revert back to a previous power state (e.g., a low power state) once the communication flow is terminated or when a timer expires.

Figure 6:
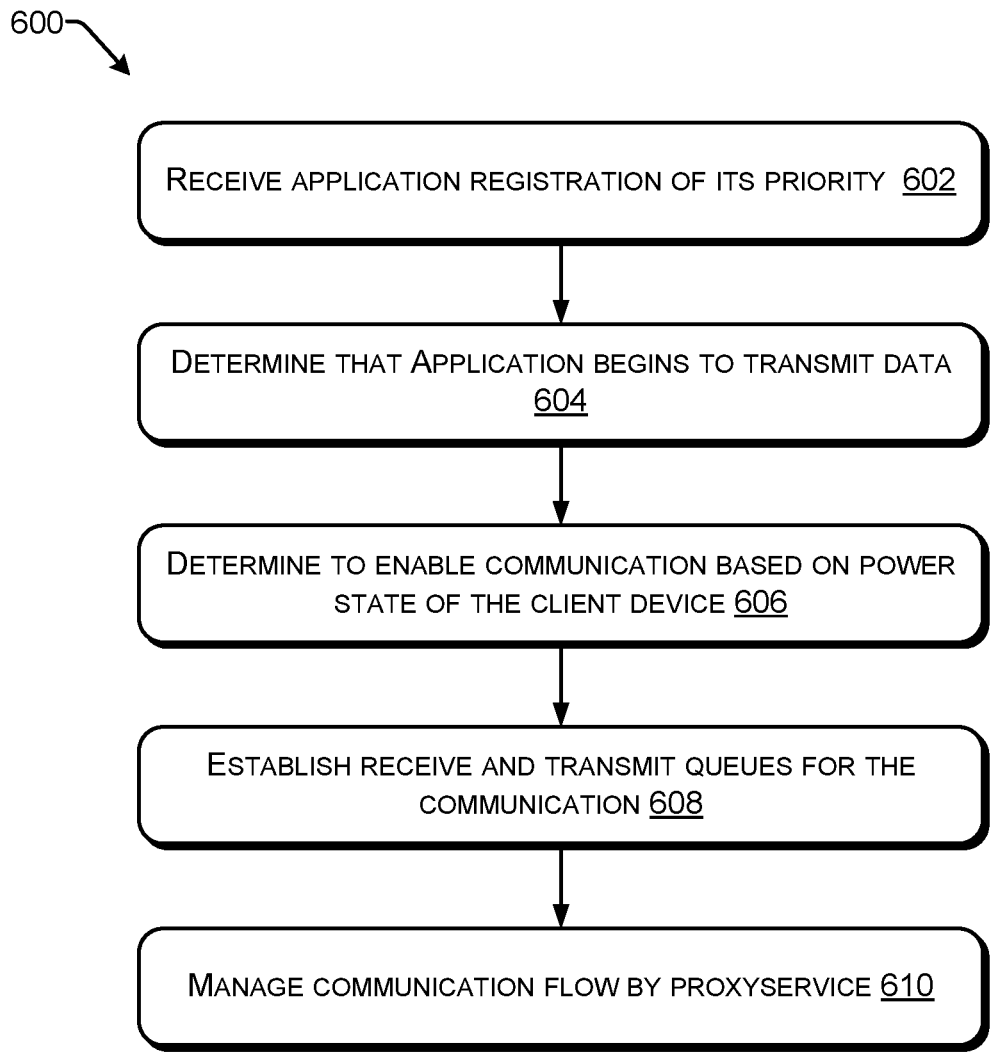
FIG. 6 illustrates a flow chart showing an example process for enabling an application to transmit data based on a power state of the client device.

FIG. 6 illustrates a flow chart showing an example process 600 for enabling an application to transmit data based on power state of the client device. At 602, an application registers its priority with a policy store, such as when the application is installed, when the application opens a communication socket as part of initialization of communication, by calling an API of the network power module, during a group policy update, and so forth. The policy store may have a pre-defined priority for a specific application or a default priority that is applied to new registrations and recorded in the policy store. The network power module creates a receive queue and a transmit queue for the communication, and sets a power-sensitive control channel filter.

At 604, the application begins to transmit data. The application may attempt to transmit data by opening a communication socket, calling an API, or by taking some other action.

At 606, the network power module checks the policy store and the power state to determine the priority of the application and the current power state of the client device. Based on the priority of the application and the power state, the network power module determines whether a packet is to be transmitted now or is to be queued for transmission later. The network power module utilizes a policy store, such as the example policy described in Table 2. If the network power module determines not to allow the transmission, the traffic may be queued for later transmission, although it may be dropped in some embodiments.

At 608, the network power module allows the transmission of the packets in a particular transmit queue depending on its power priority. Allowing transmission may include causing the network communication hardware to enter a higher power state (if it is for example in a low-power state). In some embodiments, a timer is set. After expiration of the timer, the network communication hardware may be placed into low power again. If additional packets arrive from the application, a time period of the timer may be increased or reset. While the timer runs, the network power module may permit packets in other transmit queues (e.g., from low priority applications that are not sufficiently high priority or present in sufficient quantity to enable communications on their own) to be transmitted. In such instances, high priority application traffic may be transmitted before any low power traffic, or otherwise given transmission and receipt priority. As noted elsewhere within this detailed description, the timeout expiry value of the timer may be calculated by an adaptive method where different parameters feed into the filter as coefficients resulting in a timeout that will be closer to an ideal value.

At 610, a proxy service manages the communication flow. The proxy service may manage the communication flow in various power states, such as in all power or only a subset of power states, such as in a low power state. The power state of the network hardware or the client device may revert back to a previous power state (e.g., a low power state) once the communication flow is terminated or when a timer expires.

Figure 7:
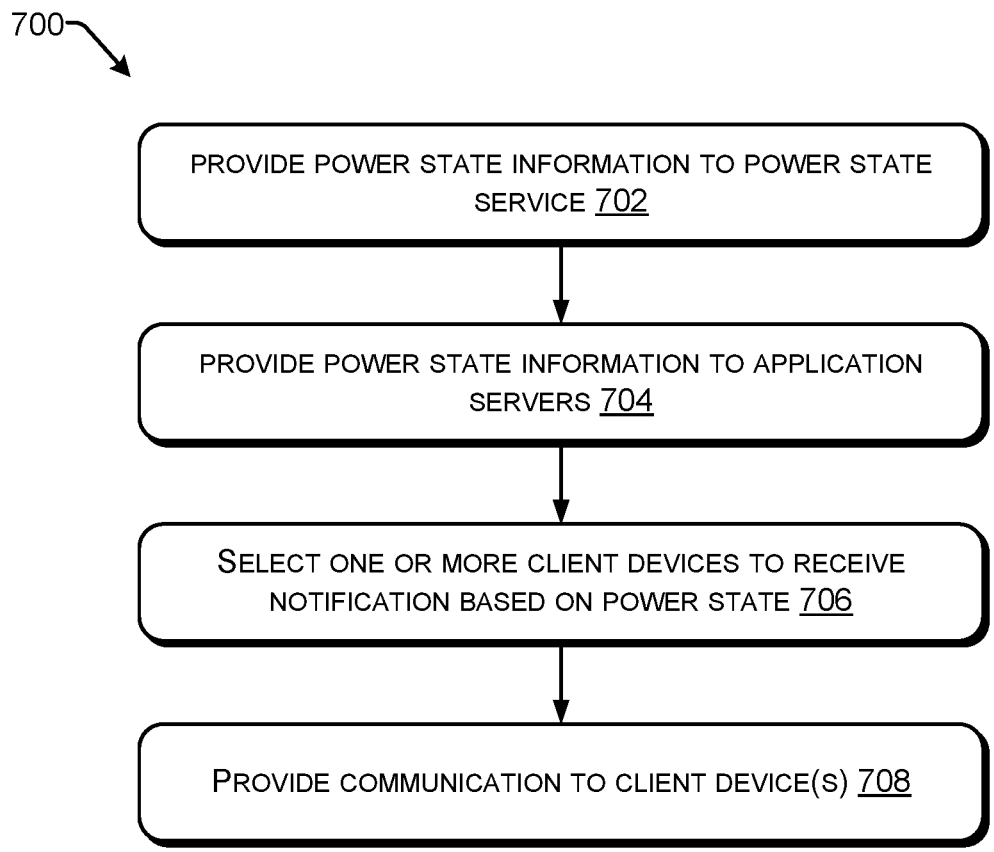
FIG. 7 illustrates a flow chart showing an example process for providing a power-aware notification service.

FIG. 7 illustrates a flow chart showing an example process 700 for providing a power-aware notification service. At 702, a plurality of client devices, such as the client devices 102, 302, 304, and 306, that are associated with a user or a user account transmit information indicating their power states with a power state service, such as the power state service 108. The power state service may execute on an application server—such as the application servers 104 and 106—or may be hosted on a separate computing system.

At 704, the power state service provides the power state information to one or more application servers, such as the application servers 104 and 106. The application servers may share power state information with one another.

At 706, the application server(s) determine one or more of the client devices to provide a communication to (e.g., a push notification), based at least on the power states of the client devices. In addition to power states, the application server may select a client device based on a priority list of the client devices, based on a UI state of the device, based on an application state of the applications executing on the client devices (e.g., based on which client device is currently executing an application associated with the application server), and so forth.

At 708, the application server transmits the communication to the selected client device(s). In one example the application servers 104 and 106 are VoIP servers, and the application server 104 may receive a VoIP call for the user account associated with a plurality of client devices. One of the client devices has a "critical" (or other low) power level, and the application server may therefore redirect an incoming VoIP call to another client device. Redirecting the VoIP call (or other notification) may include redirecting the communication through a different application server in some embodiments.

Figure 8:
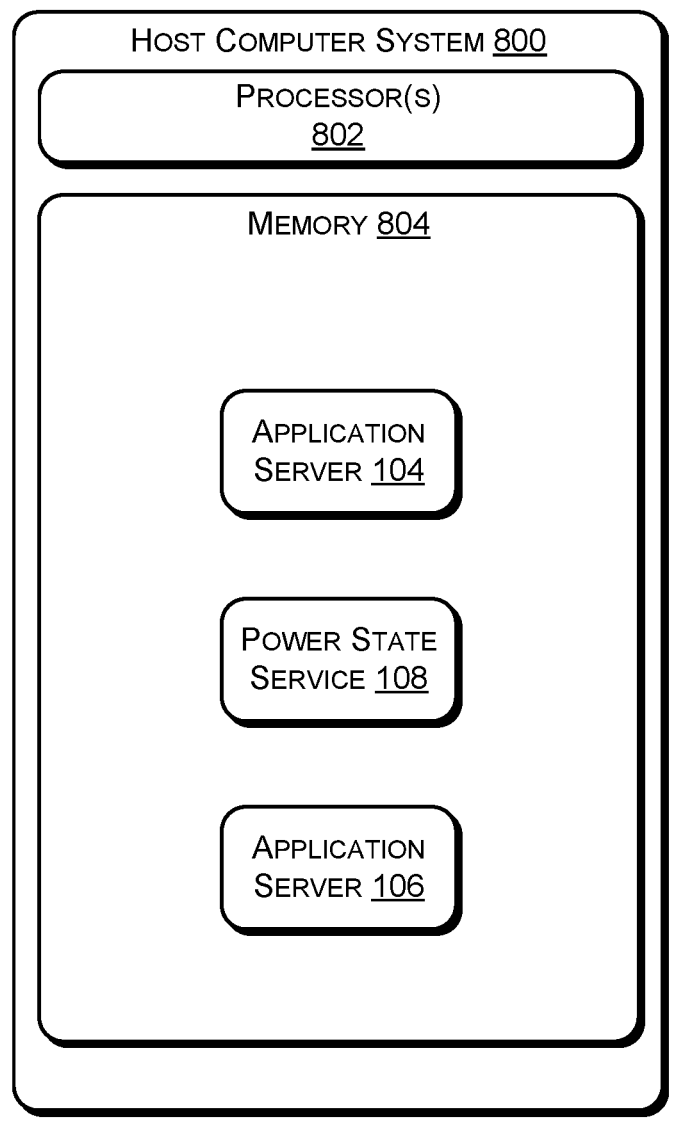
FIG. 8 illustrates a block diagram of an example host computing system enabled to provide a power state service.

FIG. 8 illustrates a block diagram of an example host computing system 800 enabled to provide a power state service. The host computing system 800 includes processors 802 and memory 804. On memory 804 is stored one or more of the application server 104, the application server 106, and the power state service 108. The host computing system may include one or more hardware devices, boxes, or racks, and may be hosted in a network data center. One or more of the application servers 104 and 106 and the power state service 108, may be instantiated as a virtual machine, application container, or similar virtualized computing resource.

According to various non-limiting examples, the computing systems described herein (such as the client devices 102, 302, 304, and 306, as well as the host computing system 800) includes one or more devices, such as servers, storage devices, tablet computers, laptops, desktop computers, gaming consoles, media players, mobile phones, handheld computers, wearable devices, smart appliances, networking equipment, kiosk devices, and so forth. In one example configuration, the computing systems comprise at least one processor. The computing systems also contain communication connection(s) that allow communications with various other systems. The computing systems also include one or more input devices, such as a keyboard, mouse, pen, voice input device, touch input device, etc., and one or more output devices, such as a display (including a touch-screen display), speakers, printer, etc. coupled communicatively to the processor(s) and computer-readable media via connections such as a bus.

The memory 216 and 804 are examples of computer-readable media. Computer-readable media stores computer-executable instructions that are loadable and executable by one or more processor(s), as well as data generated during execution of, and/or usable in conjunction with, these programs. In the illustrated example, computer-readable media stores operating system instances, which provide basic system functionality to applications 114, 308, 310, and 312, policy store 112, network power module 116, proxy service 120, device driver 206, user interface 216, power coordinator 214, logging system 212, application server 104, application server 106, power state service 108, and so forth. One or more of these components, including the operating systems, may be instantiated as virtual machines, application containers, or as some other type of virtualized instantiation.

Processor(s) 218 and 802 may include one or more single-core processing unit(s), multi-core processing unit(s), central processing units (CPUs), graphics processing units (GPUs), general-purpose graphics processing units (GPGPUs), or hardware logic components configured, e.g., via specialized programming from modules or application program interfaces (APIs), to perform functions described herein. In alternative examples one or more functions of the present disclosure may be performed or executed by, and without limitation, hardware logic components including Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), Digital Signal Processing unit(s) (DSPs), and other types of customized processing unit(s). For example, a processing unit configured to perform one or more of the functions described herein may represent a hybrid device that includes a CPU core embedded in an FPGA fabric. These or other hardware logic components may operate independently or, in some instances, may be driven by a CPU. In some examples, examples of the computing systems may include a plurality of processing units of multiple types. For example, the processing units may be a combination of one or more GPGPUs and one or more FPGAs. Different processing units may have different execution models, e.g., as is the case for graphics processing units (GPUs) and central processing units (CPUs).

Depending on the configuration and type of computing device used, computer-readable media (e.g., memory 216 and 804) include volatile memory (such as random access memory (RAM)) and/or non-volatile memory (such as read-only memory (ROM), flash memory, 3D XPoint, resistive RAM, etc.). The computer-readable media can also include additional removable storage and/or non-removable storage including, but not limited to, SSD (e.g., flash memory), HDD (Hard Disk Drive) storage or other type of magnetic storage, optical storage, and/or other storage that can provide non-volatile storage of computer-executable instructions, data structures, program modules, and other data for computing systems.

Computer-readable media can, for example, represent computer memory, which is a form of computer storage media. Computer-readable media includes at least two types of computer-readable media, namely computer storage media and communications media. Computer storage media includes volatile and non-volatile, removable and non-removable media implemented in any process or technology for storage of information such as computer-executable instructions, data structures, programming modules, or other data. Computer storage media includes, but is not limited to, phase change memory (PRAM), Resistive RAM, 3D Xpoint non-volatile memory, static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other medium that can be used to store information for access and retrieval by a computing device. In contrast, communication media can embody computer-executable instructions, data structures, program modules, or other data in a modulated data signal, such as a carrier wave, or other transmission mechanism. As defined herein, computer storage media does not include communication media.

Various processes described herein are carried out as computing functions in conjunction with networking functions. For example, one computing device or system may cause transmission of a message to another computing device via network communication hardware. This may include, for example, passing by a software module a pointer, argument, or other data to a networking module. The pointer, argument or other data may identify data stored in memory or in a register that is to be transmitted to another computing device. The networking module may include a protocol stack, and may read the data identified by the pointer, argument, or other data. The protocol stack may encapsulate the data in one or more frames, packets, cells, or other data networking protocol structures. The protocol stack (such as within the network power module or elsewhere) may call a network interface device driver, to cause physical transmission of electrical, magnetic, or optical signals along a communication medium to a network element, such as a gateway, router, switch, hub, and so forth. An underlying network may route or switch the data to the destination. The destination computing device may receive the data via a network interface card, which results in an interrupt being presented to a device driver or network adaptor. A processor of the destination computing device passes the device driver an execution thread, which causes a protocol stack to de-encapsulate the data in the packets, frames, and cells in which the data was received. The protocol stack causes the received data to be stored in a memory, a register, or other location. The protocol stack may pass a pointer, argument, or other data that identifies where the received data is stored to a destination software module executing on the destination computing device. The software module receives an execution thread along with the argument, pointer, or other data, and reads the data from the identified location.

Example Clauses

Clause A. A computing device comprising network communication hardware configured to transmit and receive through one or more access networks, one or more processors, and memory. A plurality of programming stored on the memory are executable by the one or more processors to implement at least a device driver and a network power module. The device driver is configured to interface with the network communication hardware. The network power module is configured to determine a power state of the computing device, determine a priority of an application executing on the computing device, and establish a transmit queue configured to transmit traffic from the application, using the network communication hardware via the device driver, based at least on the power state of the computing device and the priority of the application. The network power module is further configured to establish a receive queue configured to receive traffic from the network communication hardware via the device driver, and to configure a control channel filter to provide notifications to the application of the traffic received by the receive queue based at least on the priority of the application and the power state of the computing device.

Clause B. The computing device of clause A, wherein the transmit queue is further configured to permit the application to transmit traffic during a predetermined time period.

Clause C. The computing device of clause B, wherein the transmit queue prevents the application from transmitting traffic after expiration of the predetermined time period.

Clause D. The computing device of clause B, wherein the network power module is further configured to increase an amount of remaining time of the predetermined time period based at least on receipt of additional traffic associated with the application or with another application meeting or exceeding a threshold priority level.

Clause E. The computing device of clause B, wherein the control channel filter is further configured to determine the predetermined time period based at least on one or more parameters related to network performance.

Clause F. The computing device of any of clauses A through E, wherein the network power module is further configured to adapt the control channel filter to provide notifications to the application based on an access control list that identifies data packets associated with the application.

Clause G. The computing device of clause F, wherein the network power module is further configured to adapt the control channel filter upon a power state change in the computing device.

Clause H. The computing device of any of clauses A through G, wherein the application is a first application, the priority of the first application is a first priority, and the remote network accessible device is a first remote network accessible device. The transmit queue permits traffic from a second application that has a second priority to be transmitted to the second remote network accessible device via the network communication hardware during a time period during which the first application is permitted to communicate with the first remote network accessible device via the network communication hardware.

Clause I. The computing device of any of clauses A through H, wherein the network power module is further configured to prevent the application from receiving traffic from the remote network accessible device after expiration of a predetermined time period.

Clause J. The computing device of any of clauses A through I, wherein the network power module includes a proxy service that manages traffic flows between the application and the network communication hardware.

Clause K. A method comprising registering an application by a network power module of an operating system executed by a computing device, determining a priority of the application. The method comprises establishing a power state of the computing device along with a transmit queue configured to transmit traffic from the application. The method includes using the network communication hardware via a device driver, based at least on the power state of the computing device and the priority of the application. The method includes establishing a receive queue configured to receive traffic from the network communication hardware via the device driver is established, and establishing a control channel filter to provide notifications to the application of the traffic received by the receive queue based at least on the priority of the application and the power state of the computing device.

Clause L. The method of clause K, further comprising providing information regarding the power state to a device power state service that selects from amongst a plurality of devices, including the computing device, that are associated with a user to receive push notifications.

Clause M. The method of either clause K or L, further comprising establishing the transmit queue to transmit traffic from the application using the network communication hardware via the device driver during a predetermined time period.

Clause N. The method of any of clauses K through M, further comprising receiving application traffic from a low-priority application, and configuring the transmit queue to prevent transmission of traffic from the low-priority application via the network communication hardware of the computing device based at least on the power state of the computing device and the low-priority application being low-priority.

Clause O. The method of any of clauses K through N, further comprising receiving application traffic from a low-priority application, and configuring the transmit queue to enable transmission of traffic from the low-priority application to another remote network-accessible device during a time period during which the application is permitted to communicate with the remote network-accessible device via network communication hardware.

Clause P. The method of any of clauses K through O, further comprising permitting the application to communicate with the remote network accessible device using the network communication hardware of the computing device, via the device driver, further based on a user interface state of the computing device.

Clause Q. The method of any of clause K through P, further comprising providing a proxy service to the application, the proxy service managing traffic flows between the application and the network communication hardware.

Clause R. A computing system implementing a device power state service. The computing system comprises one or more processors, memory, and a plurality of programming instructions stored on the memory. The plurality of programming instructions are executable by the one or more processors to receive first data indicating first power state information from a first device associated with a user, receive second data indicating second power state information from a second device associated with the user, and cause at least one transmission to be sent to one of the first device or the second device based at least on the first power state information and the second power state information.

Clause S. The computing system of clause R, wherein the plurality of programming instructions are further executable by the one or more processors to cause transmissions to be sent to one of the first device or the second device based further on configurable information associated with the first device and the second device.

Clause T. The computing system of either clause R or S, wherein the plurality of programming instructions are further executable by the one or more processors to cause the at least one transmission to be sent by at least providing power state information regarding the one of the first device or the second device to an application server that transmits data to the user.

Clause U. A computing system comprising means for registering an application by a network power module of an operating system executed by a computing device and means for determining a priority of the application. The system includes a means for establishing a power state of the computing device and means for establishing a transmit queue configured to transmit traffic from the application. The system includes means for using the network communication hardware via a device driver, based at least on the power state of the computing device and the priority of the application. The system includes means for establishing a receive queue configured to receive traffic from the network communication hardware via the device driver, and means for establishing a control channel filter to provide notifications to the application of the traffic received by the receive queue based at least on the priority of the application and the power state of the computing device.

Clause V. The computing system of clause U, further comprising means for providing information regarding the power state to a device power state service that selects from amongst a plurality of devices, including the computing device, that are associated with a user to receive push notifications.

Clause W. The computing system of either clause U or V, further comprising means for establishing the transmit queue to transmit traffic from the application using the network communication hardware via the device driver during a predetermined time period.

Clause X. The computing system of any of clauses U through W, further comprising means for receiving application traffic from a low-priority application, and means for configuring the transmit queue to prevent transmission of traffic from the low-priority application via the network communication hardware of the computing device based at least on the power state of the computing device and the low-priority application being low-priority.

Clause Y. The computing system of any of clauses U through X, further comprising means for receiving application traffic from a low-priority application, and means for configuring the transmit queue to enable transmission of traffic from the low-priority application to another remote network-accessible device during a time period during which the application is permitted to communicate with the remote network-accessible device via network communication hardware.

Clause Z. The computing system of any of clauses U through Y, further comprising means for permitting the application to communicate with the remote network accessible device using the network communication hardware of the computing device, via the device driver, further based on a user interface state of the computing device.

Clause AA. The computing system of any of clauses U through Z, further comprising means for providing a proxy service to the application, the proxy service managing traffic flows between the application and the network communication hardware.

Clause AB. A computing system implementing a device power state service. The computing system comprising means for receiving first data indicating first power state information from a first device associated with a user, means for receiving second data indicating second power state information from a second device associated with the user, and means for causing at least one transmission to be sent to one of the first device or the second device based at least on the first power state information and the second power state information.

Clause AC. The computing system of clause AB, further comprising means for causing transmissions to be sent to one of the first device or the second device based further on configurable information associated with the first device and the second device.

Clause AD. The computing system of either clause AB or AC, further comprising means for causing the at least one transmission to be sent by at least providing power state information regarding the one of the first device or the second device to an application server that transmits data to the user.

Clause AE. A method for implementing a device power state service. The method comprising receiving first data indicating first power state information from a first device associated with a user, receiving second data indicating second power state information from a second device associated with the user, and causing at least one transmission to be sent to one of the first device or the second device based at least on the first power state information and the second power state information.

Clause AF. The method of clause AE, further comprising causing transmissions to be sent to one of the first device or the second device based further on configurable information associated with the first device and the second device.

Clause AG. The method of either clause AE or AF, further comprising causing the at least one transmission to be sent by at least providing power state information regarding the one of the first device or the second device to an application server that transmits data to the user.

CONCLUSION

Although the techniques have been described in language specific to structural features and/or methodological acts, it is to be understood that the appended claims are not necessarily limited to the features or acts described. Rather, the features and acts are described as example implementations.

All of the methods and processes described above may be embodied in, and fully automated via, software code modules executed by one or more general purpose computers or processors. The code modules may be stored in any type of computer-readable storage medium or other computer storage device. Some or all of the methods may alternatively be embodied in specialized computer hardware.

Conditional language such as, among others, "can," "could," "might" or "may," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example. Conjunctive language such as the phrase "at least one of X, Y or Z," unless specifically stated otherwise, is to be understood to present that an item, term, etc. may be either X, Y, or Z, or a combination thereof.

Any routine descriptions, elements or blocks in the flow diagrams described herein and/or depicted in the attached figures should be understood as potentially representing modules, segments, or portions of code that include one or more executable instructions for implementing specific logical functions or elements in the routine. Alternate implementations are included within the scope of the examples described herein in which elements or functions may be deleted, or executed out of order from that shown or discussed, including substantially synchronously or in reverse order, depending on the functionality involved as would be understood by those skilled in the art. It should be emphasized that many variations and modifications may be made to the above-described examples, the elements of which are to be understood as being among other acceptable examples. All such modifications and variations are within the scope of this disclosure and protected by the following claims.

What is claimed is:

1. A computing device, comprising:
   network communication hardware configured to transmit and receive through one or more access networks;
   one or more processors;
   memory; and
   a plurality of programming instructions stored on the memory and executable by the one or more processors to configure the computing device to:
   determine a power state of the computing device;
   determine a priority of an application executing on the computing device;
   establish a transmit queue configured to transmit traffic from the application using the network communication hardware, wherein the transmit queue is configured to permit the application to transmit the traffic from the application during a predetermined time period established based at least on the power state of the computing device and the priority of the application and to prevent the application from transmitting the traffic from the application after expiration of the predetermined time period;
   establish a receive queue configured to receive traffic from the network communication hardware; and
   configure a control channel filter to provide notifications to the application of the traffic received by the receive queue based at least on the priority of the application and the power state of the computing device.

2. The computing device of claim 1, wherein the plurality of programming instructions further configures the computing device to increase an amount of remaining time of the predetermined time period based at least on receipt of additional traffic associated with the application or with another application meeting or exceeding a threshold priority level.

3. The computing device of claim 1, wherein the control channel filter is further configured to determine the predetermined time period based at least on one or more parameters related to network performance.

4. The computing device of claim 1, wherein the plurality of programming instructions further configures the computing device to adapt the control channel filter to provide notifications to the application based on an access control list that identifies data packets associated with the application.

5. The computing device of claim 4, wherein the plurality of programming instructions further configures the computing device to adapt the control channel filter upon a power state change in the computing device.

6. The computing device of claim 1, wherein the application is a first application configured to transmit the traffic from the application to a first remote network accessible device, the priority of the first application is a first priority, and the transmit queue permits traffic from a second application having a second priority to be transmitted to a second remote network accessible device via the network communication hardware during a time period during which the first application is permitted to communicate with the first remote network accessible device via the network communication hardware.

7. The computing device of claim 1, wherein the plurality of programming instructions further configures the computing device to prevent the application from receiving traffic from a remote network accessible device after expiration of another predetermined time period.

8. The computing device of claim 1, further comprising a proxy service that manages traffic flows between the application and the network communication hardware.

9. A method comprising:
registering an application by an operating system executed by a computing device;
determining a priority of the application;
determining a power state of the computing device;
establishing a transmit queue configured to transmit traffic from the application, using network communication hardware, wherein the transmit queue is configured to permit the application to transmit the traffic from the application during a predetermined time period established based at least on the power state of the computing device and the priority of the application and to prevent the application from transmitting the traffic from the application after expiration of the predetermined time period;
establishing a receive queue configured to receive traffic from the network communication hardware; and
configuring a control channel filter to provide notifications to the application of the traffic received by the receive queue based at least on the priority of the application and the power state of the computing device.

10. The method of claim 9, further comprising providing information regarding the power state to a device power state service that selects from amongst a plurality of devices, including the computing device, that are associated with a user to receive push notifications.

11. The method of claim 9, further comprising:
receiving traffic from a low-priority application; and
configuring the transmit queue to prevent transmission of the traffic from the low-priority application via the network communication hardware of the computing device based at least on the power state of the computing device and the low-priority application being low-priority.

12. The method of claim 9, further comprising:
receiving traffic from a low-priority application; and
configuring the transmit queue to enable transmission of the traffic from the low-priority application to a remote network accessible device during a time period during which the application is permitted to communicate with another remote network accessible device via the network communication hardware.

13. The method of claim 9, further comprising permitting the application to communicate with a remote network accessible device using the network communication hardware of the computing device based on a user interface state of the computing device.

14. The method of claim 9, further comprising providing a proxy service to the application, the proxy service managing traffic flows between the application and the network communication hardware.

* * * * *